(12) United States Patent
Parker

(10) Patent No.: US 8,265,230 B1
(45) Date of Patent: *Sep. 11, 2012

(54) TRUNK LEVEL ECHO CANCELLER TEST SYSTEM

(75) Inventor: Benjamin J. Parker, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1528 days.

This patent is subject to a terminal disclaimer.

(21) Appl. No.: 11/474,870

(22) Filed: Jun. 26, 2006

Related U.S. Application Data

(63) Continuation of application No. 09/981,978, filed on Oct. 17, 2001, now Pat. No. 7,095,720.

(51) Int. Cl.
*H04M 1/24* (2006.01)
(52) U.S. Cl. .......... 379/3; 379/406.01; 370/286
(58) Field of Classification Search .......... 370/228, 370/396, 286–292; 379/3, 406.04–406.16
See application file for complete search history.

(56) References Cited

U.S. PATENT DOCUMENTS

| | | | |
|---|---|---|---|
| 4,558,187 A | 12/1985 | Billi et al. | |
| 4,903,261 A * | 2/1990 | Baran et al. | 370/396 |
| 5,008,923 A * | 4/1991 | Kitamura et al. | 379/3 |
| 6,067,299 A | 5/2000 | DuRee | |
| 6,411,117 B1 * | 6/2002 | Hatamian | 324/765 |
| 6,738,358 B2 * | 5/2004 | Bist et al. | 370/289 |
| 2002/0064139 A1 * | 5/2002 | Bist et al. | 370/289 |

OTHER PUBLICATIONS

Audio Conferencing, 2002, ClearOne Communications, Inc.*
EchoFree EF200, ASPI Digital, 1999.*
Abousaada et al., An Echo Tail Canceller Based on Adaptive Interpolated FIR Filtering, Jul. 1992, IEEE, vol. 39, p. 1.*

* cited by examiner

*Primary Examiner* — Md S Elahee

(57) ABSTRACT

Integrated echo cancellers in a telecommunications system are tested using a test apparatus connected to the main communications trunk where a large number of individual signals are multiplexed together. The signals are de-multiplexed in the test apparatus and specific amounts of echo delay, echo magnitude, and line delay can be introduced for any selected signals within the group on the trunk. The signals are then re-multiplexed and returned to the trunk in a direction back toward the echo canceller.

7 Claims, 7 Drawing Sheets

TRUNK LEVEL ECHO CANCELLER TEST SYSTEM

CROSS REFERENCE TO RELATED APPLICATIONS

This application is a continuation of U.S. application Ser. No. 09/981,978, filed Oct. 17, 2001 now U.S. Pat. No. 7,095,720, entitled "Trunk Level Echo Canceller Test System."

STATEMENT REGARDING FEDERALLY SPONSORED RESEARCH

Not Applicable.

BACKGROUND OF THE INVENTION

The present invention relates in general to testing echo cancellers in telecommunication systems, and, more specifically, to individually testing echo cancellers for individual subscriber terminals without directly connecting to individual echo cancellers.

Due to impedance mismatches in transmission line terminations and due to transmission delays within telephone systems, electrical signal reflections (i.e., echoes) can be inadvertently created in telephone transmissions. To avoid a degradation in the voice or data signals, echo cancellers are typically deployed in central offices for each individual subscriber line connection (an individual line often being referred to as a DS-0). Echo cancellers most often use digital signal processing and are typically integrated within communication system components such as the codecs that interface between an analog terminal and a public telephone network.

As telecommunications networks increase in size and complexity, the importance of accurate and timely testing of existing and new equipment becomes great. In order to provide competitively priced service, however, the costs of testing and maintenance need to be kept low. The amount and types of test equipment, set-up times, and test procedures used by conventional echo canceller testing have resulted in high costs and slow performance. In a typical prior art procedure, for example, each DS-0 has been separately broken-out physically at a D Bank with media simulators and digital cross-connects being connected to each. Such a process has a long set-up time and is labor intensive.

Prior test equipment and methods have also been limited with respect to the types of tests and test signals that could be generated. Thus, there has continued to be a lack of flexibility in echo canceller testing, with test equipment having to be specifically designed for narrowly defined tests.

SUMMARY OF THE INVENTION

The present invention provides advantages of quick and simple test set-up with a small set of test equipment to conduct testing with a wide variety of test parameters and allowing for selective testing of any of a large number of echo cancellers with one set-up and without disrupting simultaneous use of the communication channels being tested.

The present invention involves connecting test apparatus to a main communications trunk where a large number of individual signals are multiplexed together. The signals are de-multiplexed in a test apparatus and specific amounts of echo delay, echo magnitude, and line delay can be introduced for any selected signals, either automatically or under control of a test technician. The signals are then re-multiplexed and returned to the trunk.

In one aspect of the invention, a test apparatus comprises a first line interface for providing layer-1 interfacing to a communications trunk carrying a trunk signal. A first framer is coupled to the first line interface providing layer-2 interfacing to the trunk signal to make available frames of multiplexed individual subscriber signals. The individual subscriber signals each include respective transmit and receive signals. A test controller is coupled to the first framer for continuously de-multiplexing the frames, sampling a de-multiplexed individual transmit signal from a selected individual subscriber signal, storing the samples in a queue for a selected echo delay, adding the samples to an individual receive signal for the selected individual subscriber signal after the selected echo delay, and continuously re-multiplexing the frames.

DETAILED DESCRIPTION OF PREFERRED EMBODIMENTS

Figure 1:
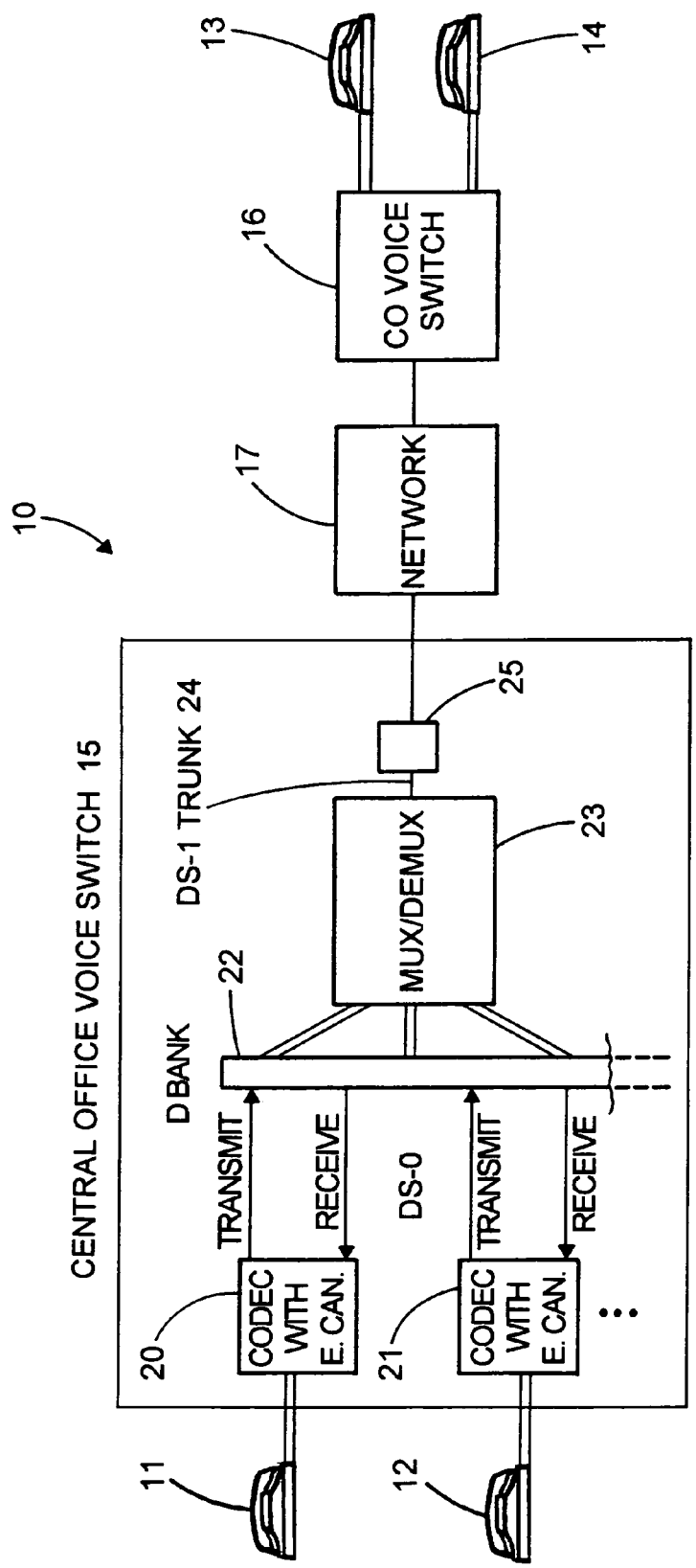
FIG. 1 is a block diagram showing elements of a telecommunications system.

Referring to FIG. 1, a telecommunications system 10 services a plurality of terminal devices 11-14 which may comprise telephone sets at customer premises. Each terminals is connected by a distribution cable to a local central office. Each central office performs a voice switching function. Thus, terminals 11 and 12 are connected to a central office voice switch 15 and terminals 13 and 14 are connected to their respective central office voice switch 16. The central offices are connected by a network 17 which depending upon their proximity may include a direct cable connection, cable connection through intervening central offices, or a long-distance network. In any case, many phone calls by individual customers (i.e., subscribers) are multiplexed together into a single signal and forwarded from the central office over a trunk.

Central office 15 includes codecs 20 and 21 connected to terminal to devices 11 and 12, respectively. A codec or coder/decoder interfaces between analog phone signals and a digitized format known as DS-0 (Digital Service Level Zero). Codecs 20 and 21 further include echo cancellers as known in the art. A transmit (outgoing) DS-0 and a receive (incoming) DS-0 are exchanged through a D Bank connector 22 with a multiplexer/de-multiplexer 23. Twenty four DS-0 signals are multiplexed (along with formatting and control information) into a DS-1 (Digital Service Level One) and sent via a trunk 24 to network 17. Trunk 24 also includes a DS-1 line carrying returning signals.

Patch panels are included throughout a central office for tapping into various signals, including a patch panel 25 which allows access to the DS-1 (or T-1) signals for testing. However, previous testing performed to determine individual echo canceller performance has required physically breaking out individual DS-0 signals (e.g., at D Bank connector 22), resulting in long set-up times, cumbersome test procedures, and/or limited results.

Figure 2:
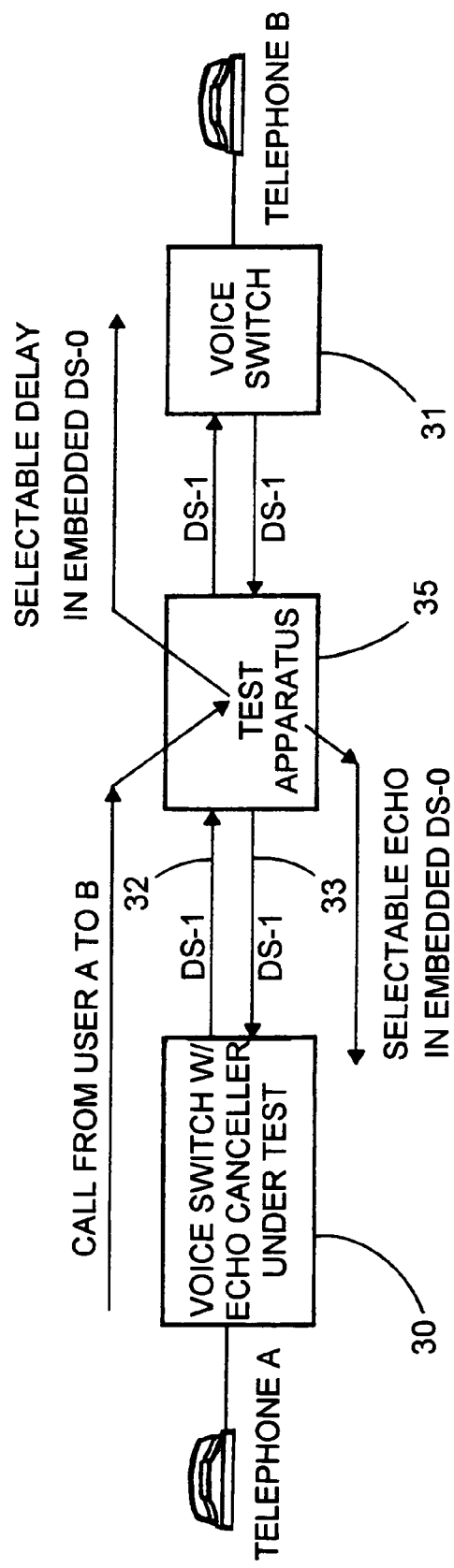
FIG. 2 is a block diagram showing new functions of the present invention.

The present invention solves the foregoing problems using a test architecture as shown in FIG. 2. A voice switch with echo canceller 30 has a transmit DS-1 line 32 and a receive DS-1 line 33. During a phone call, a circuit is established from a telephone terminal A (connected to voice switch 30) to a telephone terminal B (connected to a voice switch 31). According to the present invention, a test apparatus 35 is patched into DS-1 lines 32 and 33 in order to electronically recover any DS-0 channel and manipulate it to introduce a customizable echo and/or a selected line delay. For example, a call from terminal A to a terminal B (either real or simulated) is established and provides source signals upon which an echo canceller within voice switch 30 can operate. Test apparatus 35 accesses embedded DS-0 signals within transmit line 32 and samples and holds them for a selected delay before forwarding them on to voice switch 31. Due to feedback or cross-talk at voice switch 31 and terminal B, a portion of the delayed signal would typically be present in the return transmission from voice switch 31 thereby creating echo on receive line 33. The same samples are held within test apparatus 35 for a selected echo delay and are then summed onto receive line 33 in order to directly create an echo to be cancelled.

Figure 3:
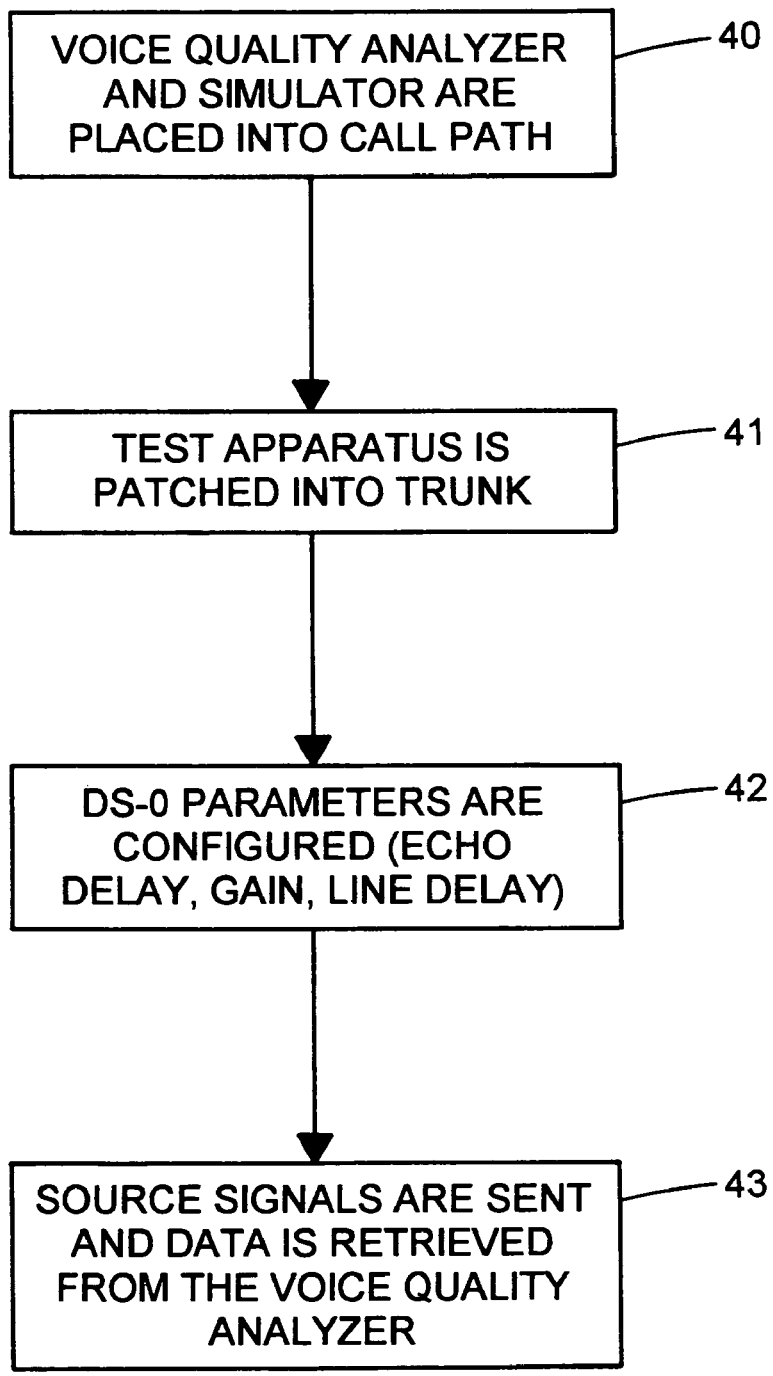
FIG. 3 is a flowchart of an overall test method of the present invention.

A preferred test method of the invention follows the steps of FIG. 3. In step 40, a voice quality analyzer and simulator are placed into the call path, e.g., by simply connecting to the input of a selected codec. A conventional analyzer and simulator may be employed, such as the Spectra System from Inet Technologies, Inc.

In step 41, the test apparatus of the present invention is patched into the DS-1 lines in the trunk. This is preferably done at a patch panel and is accomplished with only four jumper cables. In step 42, parameters for treating any selected ones of the embedded DS-0 signals are configured, including a selected amount of echo delay, an echo signal gain, and/or a line delay assigned to any or all of the DS-0's. The parameter configuration may be set either before or after patching the test apparatus into the trunk.

In step 43, source signals are sent with the test apparatus actively processing the DS-1 lines. Performance data from the voice quality analyzer is retrieved and evaluated to verify performance of each corresponding echo canceller. The source signals can be actual conversation from a telephone terminal in a real call or can be synthesized with a simulator.

Figure 4:
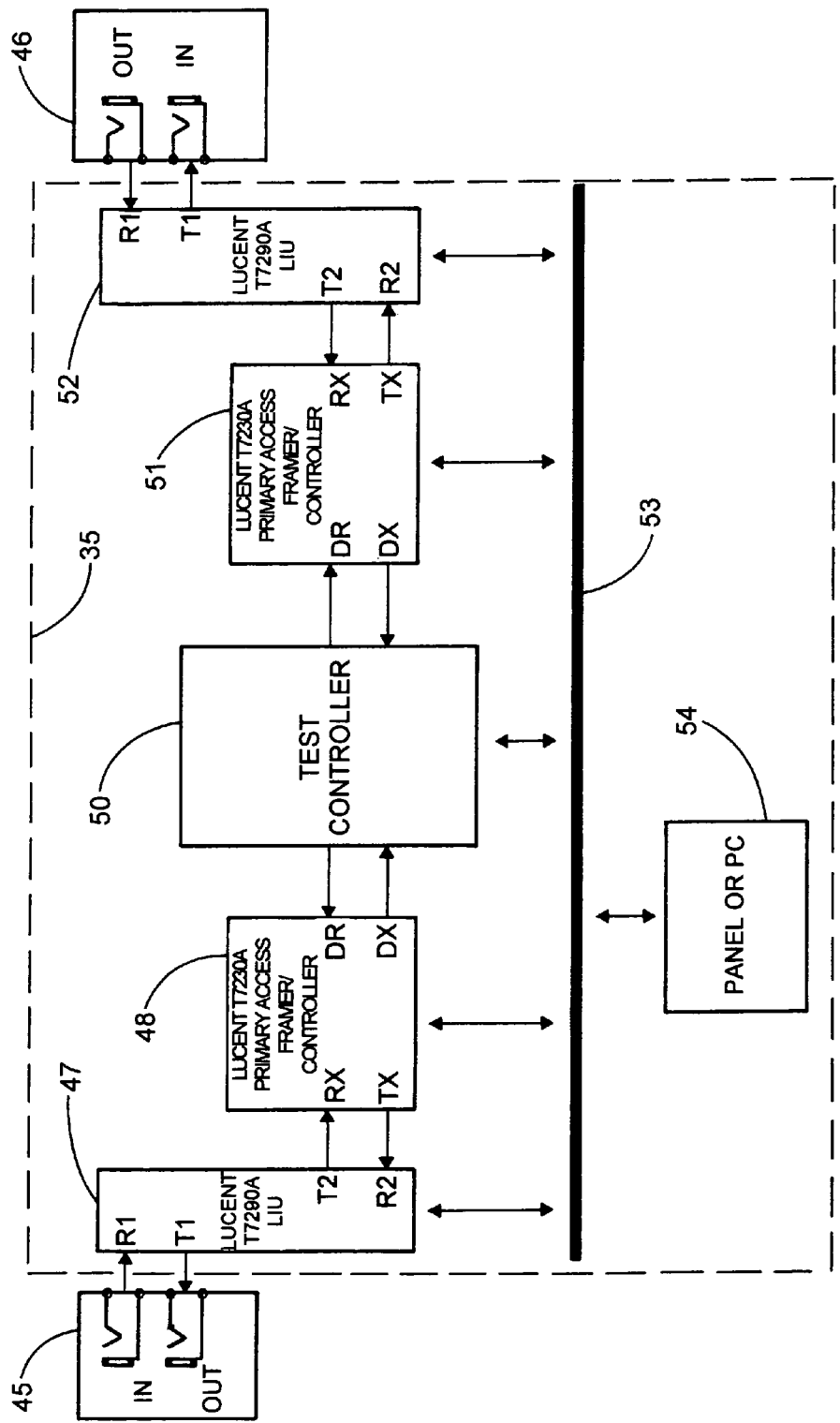
FIG. 4 is a schematic diagram of a preferred embodiment of a test apparatus.

The test apparatus itself is shown in greater detail in FIG. 4 connected between patch panel blocks 45 and 46 so that test apparatus 35 is in series with the pair of DS-1 lines corresponding to the echo cancellers to be tested. Patch panel block 45 may be considered as the east end and patch panel block 46 as the west end of the jumper connection.

A first line interface unit (LIU) 47 has a receive input R1 connected to the transmit DS-1 from block 45 and a transmit output T1 connected to the receive DS-1 to block 45. LIU 47 may be comprised of a Lucent T7290A integrated circuit, for example. LIU 47 has a transmit output T2 connected to a receive input RX of a primary access framer/controller 48 and a receive input R2 connected to transmit output TX of framer 48. LIU 47 provides physical line interfacing at a layer one level as required to connect with a patch panel. Thus, it performs impedance matching, signal regeneration, clock recovery, pulse shaping, and equalization. Preferably, LIU 47 should support both a T-1/DS-1 data rate and a CEPT/E-1 data rate to facilitate the use of the test apparatus with many different systems.

Framer 48 can comprise a Lucent T7230A integrated circuit, for example. It provides the layer two formatting required to interfacing to the TDM environment wherein the DS-0 signals can be manipulated. To maximize flexibility, framer 48 should preferably support line coding in alternate mark inversion (AMI), binary eight zero code suppression (B8ZS), and high-density bipolar 3 (HDB3) and support framing formats of extended superframe (ESF), T1D4, T1DM, SLC-96 super framing, CEPT basic, and Timeslot 0 and 16 multiframing, among others.

Framer 48 has a receive concentration highway interface (CHI) data port DR and a transmit CHI data port DX connected to a test controller 50. Test controller 50 provides the main functionality of the test apparatus and may be comprised of a custom chip set, such as a field-programmable gate array (FPGA) or an application-specific integrated circuit (ASIC) or combinations of these.

A framer 51 and an LIU 52 are connected between test controller 50 and patch panel block 46 as a mirror image of LIU 47 and framer 48 and perform the same functions. LIU's 47 and 52, framers 48 and 51, and test controller 50 all have control lines connected to a control interface 53. A control panel 54 is also connected to control interface 53 and provides a human-machine interface for configuring the test apparatus as desired. Control panel 54 can be a specially designed interface using a custom programmed microprocessor, or can comprise a personal computer (PC) or other general purpose machine with appropriate software. Control interface 53 preferably uses a 10 Base-T Ethernet protocol allowing for control via an IP connection. In a preferred embodiment, the parameters to be configured over control interface 53 include an echo delay setting for each embedded DS-0, a gain setting for each embedded DS-0 having an echo delay, and a line delay setting for each embedded DS-0.

Figure 5:
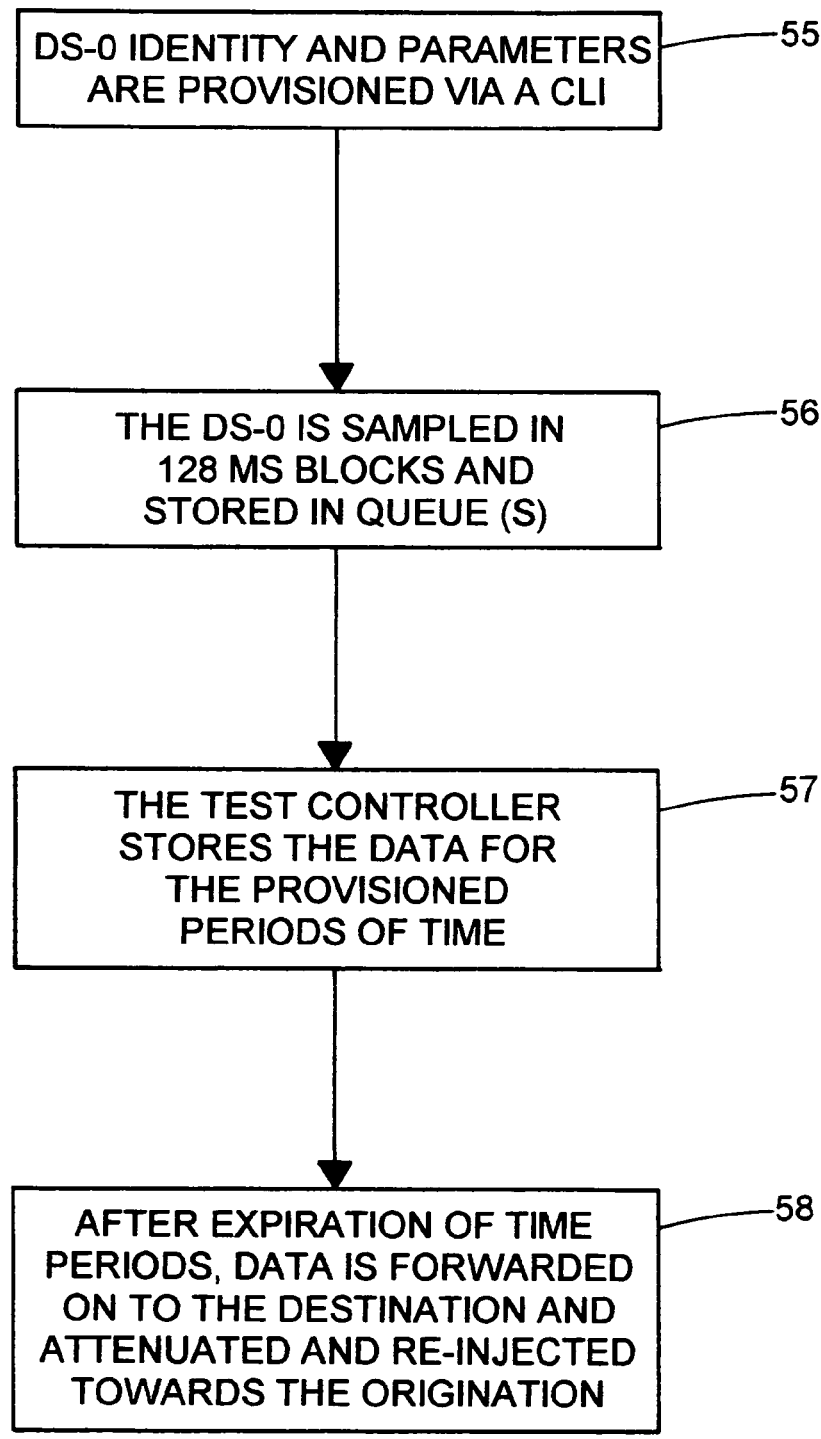
FIG. 5 is a flowchart showing operation of the test apparatus.

The operation of test controller 50 is summarized by the flowchart shown in FIG. 5. The identity and parameter settings are provisioned in step 55 using a command line interface, for example. When the test actually commences in step 56, each DS-0 is sampled and stored in queues (e.g., delay lines). Rather than each sample being just one audio sample in the DS-0, the invention instead samples signals in blocks to achieve a more efficient architecture. For example, 1024 samples of each DS-0 are included in a sample block. Since a standard DS-0 is sampled at 8000 Hz, each sample block corresponds to 128 milliseconds.

Once collected, each sample block is stored for the provisioned time periods in step 57. After the time periods for line delay or echo delay expire in step 58, the sample blocks are forwarded on to the destination and they are attenuated by each respective gain setting and are injected into the return DS-0 toward the origination for each DS-0 having an echo delay.

Figure 6:
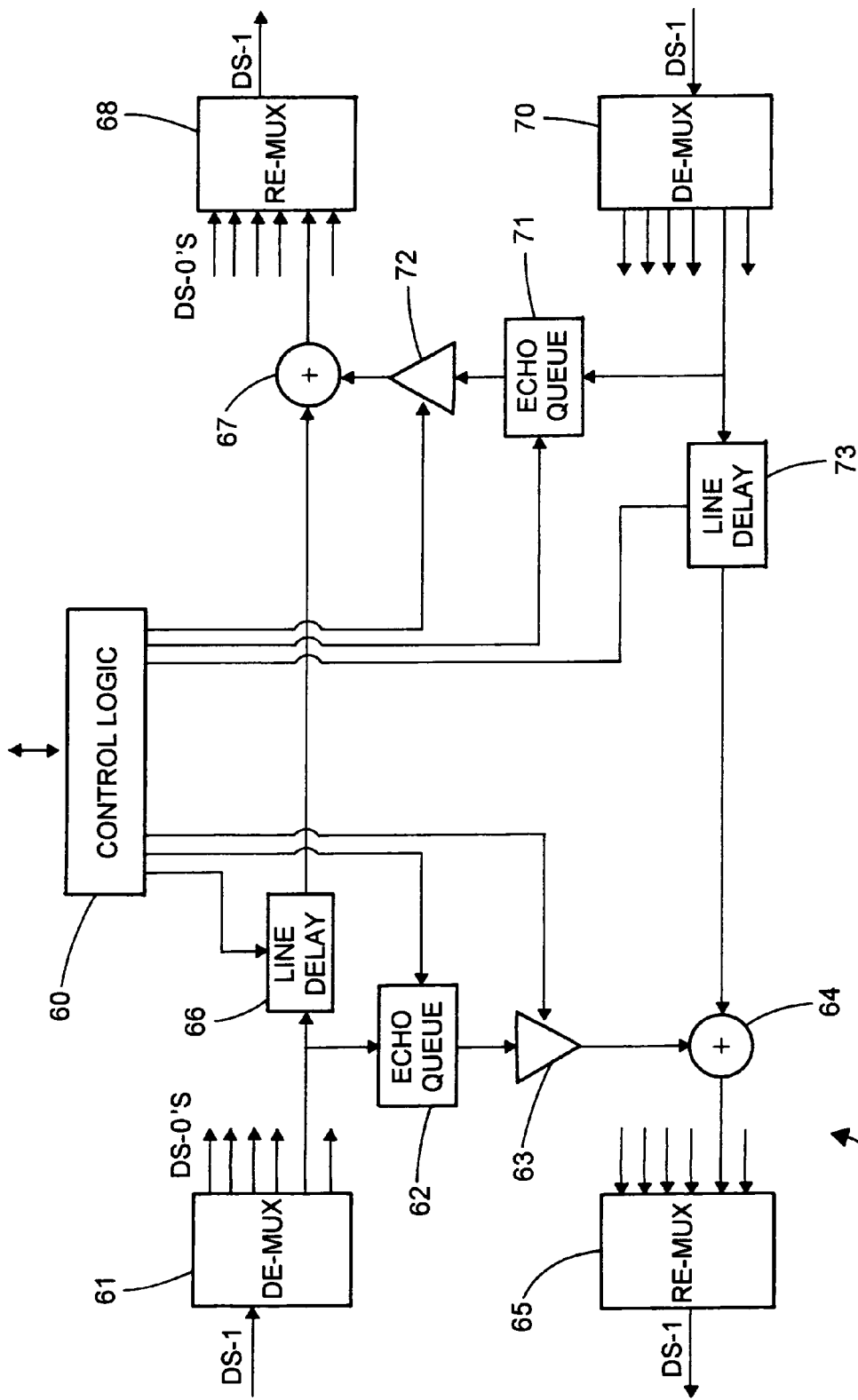
FIG. 6 is a schematic diagram showing the test controller of FIG. 4 in greater detail.

Test controller 50 is shown in greater detail in FIG. 6. A control logic block 60 is connected to the control interface and implements the parameter settings within the test controller. A de-multiplexer 61 receives DS-1 frames from framer 48. All the DS-0's are de-multiplexed and separately treated within test controller 50. Treatment of only one matched pair of DS-0's is shown in FIG. 6 for clarity.

The transmit DS-0 is coupled to an echo queue 62 and a variable gain block 63, both of which are connected to control logic 60. Echo queue holds a selected number of blocks corresponding to a desired echo delay in whole multiples of the block length. For example, with a block length of 128 milliseconds, then selected delays of from 128 to 5120 milliseconds in increments of 128 milliseconds can preferably be obtained. A delay of zero is also available by not adding any delayed signal at all.

Once released from echo queue 62 at the end of a selected echo delay, the sample blocks are attenuated in a gain block 63. In a preferred embodiment, a selectable gain in the range from about −10 to about −60 dB is commanded by control logic 60. An attenuated echo signal is coupled to one input of a summer 64 so that it is injected into the receive DS-0 signal returning to the echo canceller being tested. Thus, the output of summer 64 is connected to a re-multiplexer 65 where the DS-0 signal with injected echo is multiplexed into a DS-1 frame for return to the call origination.

If testing an echo canceller without wanting full duplex communication taking place, then only the portion of test controller 50 described so far needs to be used. In full duplex operation, the embedded DS-0 transmit line being considered is coupled through a line delay 66 which is controlled by control logic 60. Delay line 66 can be the same as echo queue 62 except that if a line delay of zero is desired, then the DS-0 signal blocks must pass through line delay 66 unhindered rather than being blocked as is the case for the echo queue. Line delay may also be selected within a range from 0 to 5120 milliseconds in 128 millisecond increments.

The delayed DS-0 from line delay 66 is coupled to one input of a summer 67 and then to a re-multiplexer 68 for formatting into a DS-1 frame to be forwarded to the call destination.

A returning DS-1 signal from the call destination is coupled to a de-multiplexer 70. In order to allow simultaneous testing of an echo canceller at the destination, an echo queue 71, gain block 72, and a line delay 73 operate in an identical manner.

Figure 7:
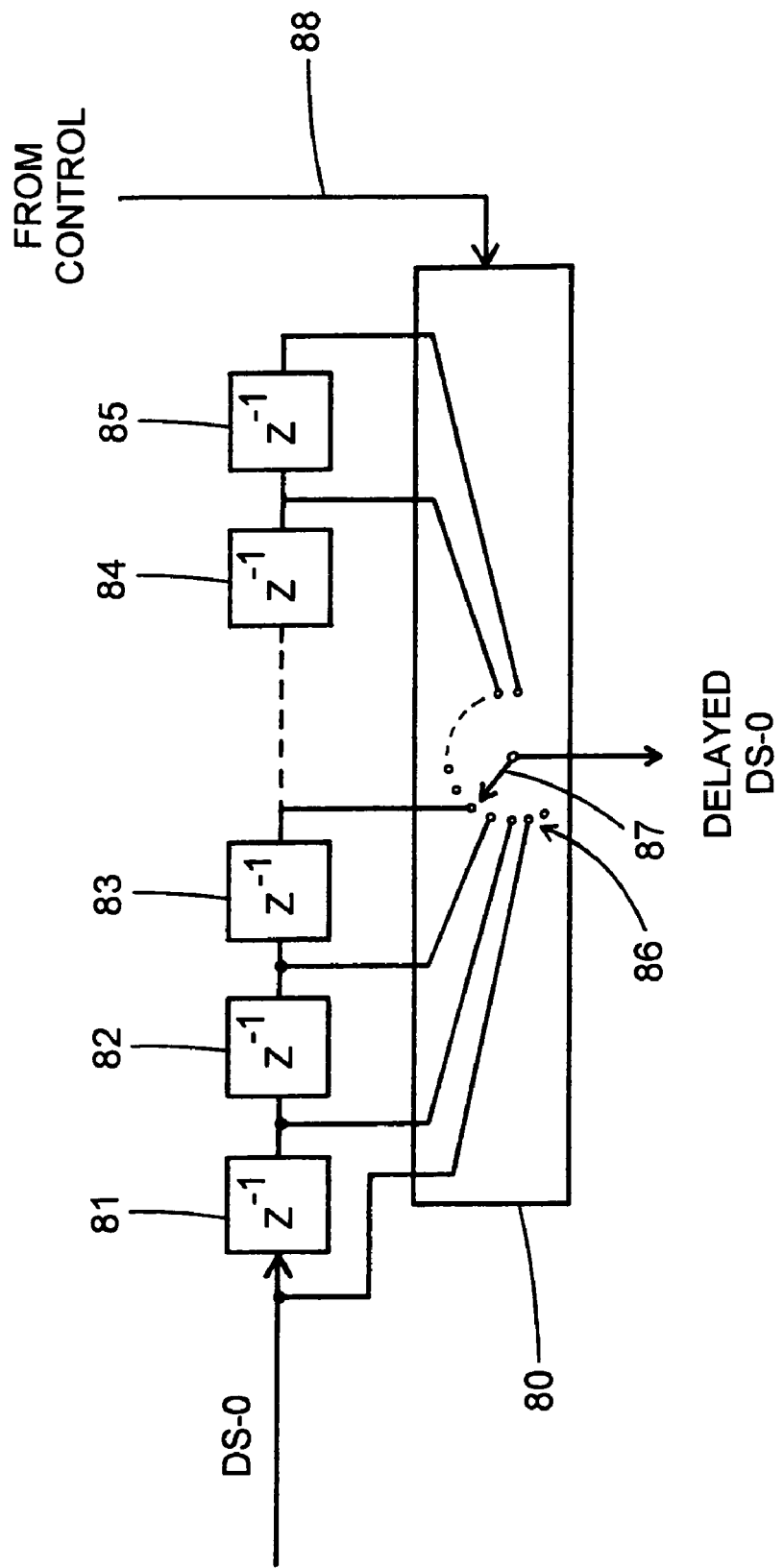
FIG. 7 is a block diagram showing a delay block or queue in greater detail.

FIG. 7 shows a queue or buffer in the form of a multi-tapped delay line which can be used for the echo queues and delay lines of FIG. 6. A DS-0 block (e.g., 1024 consecutive samples) is coupled to one input of a plurality of inputs 86 of a selector 80 and to the input of a unit delay block 81. Additional unit delay blocks, including blocks 82-85, are cascaded in series and the output of each unit delay block is connected to a respective one of inputs 86 of selector 80. An output path 87 is established between a selected input and the output of selector 80 in response to a control signal 88 from the control logic. Separate inputs 86 correspond to an open setting (i.e., signal is blocked for no echo), a bypass setting (i.e., signal is not delayed), and each delay interval within the desired range of delays.

As a result of the foregoing description, a test apparatus and method have been shown for testing integrated echo cancellers. Integration of telecommunication system components makes testing of individual functions, such as echo cancellers, much more difficult. The invention can verify the functionality of a single echo canceller or an array of echo cancellers within the same DS-1 trunk at one time. The invention achieves treatment of individual, embedded DS-0's without destroying the integrity of the original trunk signal.

What is claimed is:

1. Apparatus for patching into a communications trunk such that the apparatus has an east end coupled to echo cancellers for subscriber terminals and the apparatus has a west end coupled to the communications trunk, wherein the communications trunk includes a transmit DS-1 line and a receive DS-1 line each carrying multiplexed DS-0 signals, and wherein said apparatus is connected in series by a jumper connection into the communications trunk such that the transmit DS-1 line has respective east and west ends and the receive DS-1 line has respective east and west ends, comprising:

a first line interface for providing layer-1 interfacing to said east end of said transmit DS-1 line and said east end of said receive DS-1 line;

a first framer coupled to said first line interface providing layer-2 interfacing to make available frames of multiplexed individual subscriber DS-0 signals from said transmit and receive DS-1 lines; and a test controller coupled to said first framer for continuously de-multiplexing said frames from said first framer corresponding to said transmit DS-1 line, sampling a de-multiplexed individual transmit signal from a selected individual subscriber DS-0 signal, storing said samples in a queue for a selected echo delay, adding said samples to an individual receive signal for said selected individual subscriber DS-0 signal after said selected echo delay, continuously re-multiplexing said frames, and providing said re-multiplexed frames to said first framer for returning to said east end of said receive DS-1 line.

2. The apparatus of claim 1 wherein said test controller is further adapted to delay said samples for a selected line delay and to provide said line-delayed samples as an individual transmit signal of said selected individual subscriber DS-0 signal for re-multiplexing.

3. The apparatus of claim 1 wherein said test controller further comprises a selectable gain for adjusting a gain of said samples prior to adding them to an individual receive DS-0 signal.

4. The apparatus of claim 3 wherein said selectable gain is adjustable with a range from about −10 to about −60 dB.

5. The apparatus of claim 1 wherein separate echo delays and separate line delays are programmable for each individual subscriber DS-0 signal.

6. The apparatus of claim 5 wherein said delays are programmable within a range of from about 125 milliseconds to about 5 seconds.

7. A method for testing echo cancellers for connecting to individual terminals, said individual terminals exchanging transmit and receive signals within a telecommunications system including a communications trunk carrying DS-1 signals between first and second voice switches, said method comprising the steps of:

receiving respective transmit signals in said telecommunications system from each of said individual terminals;

multiplexing a plurality of transmit signals into respective slots in a multiplexed signal at the first voice switch;

coupling said multiplexed signal to a termination of said communications trunk;

connecting a test apparatus to said communications trunk at said termination;

de-multiplexing said plurality of transmit and receive signals within said test apparatus;

sampling at least one selected de-multiplexed transmit signal from its respective slot;

re-multiplexing said de-multiplexed transmit signals into said respective slots in a re-multiplexed transmit signal and coupling said re-multiplexed transmit signal to said termination of said communications trunk;

delaying said sampled signal by a selected echo delay to generate a delayed echo signal;

adding said delayed echo signal to a selected de-multiplexed receive signal corresponding to said selected de-multiplexed transmit signal;

re-multiplexing said de-multiplexed receive signal in said test apparatus after said addition step and coupling said re-multiplexed received signal to said termination of said communications trunk;

de-multiplexing said receive signal at said first voice switch from said termination of said communications trunk to recover said receive signals;

passing said receive signals through respective echo cancellers to generate echo-cancelled signals; and evaluating cancellation of said delayed echo signal by a corresponding echo canceller.

* * * * *